April 4, 1961 T. T. BUNCH 2,977,632
CENTRIPETAL EXTRUDER
Filed April 10, 1959 2 Sheets-Sheet 1

INVENTOR
T. T. BUNCH.
BY
*H. J. Winegar*
ATTORNEY

April 4, 1961  T. T. BUNCH  2,977,632
CENTRIPETAL EXTRUDER
Filed April 10, 1959  2 Sheets-Sheet 2

INVENTOR
T. T. BUNCH
BY H. J. Winegar
ATTORNEY

United States Patent Office 2,977,632
Patented Apr. 4, 1961

2,977,632

CENTRIPETAL EXTRUDER

Tillman T. Bunch, near Ashland, Md., assignor to Western Electric Company, Incorporated, New York, N.Y., a corporation of New York Filed Apr. 10, 1959, Ser. No. 805,418

11 Claims. (Cl. 18—13)

The present invention relates generally to centripetal extruders, and more particularly to multiple centripetal extruders having two or more extrusion channels for extruding concentric layers of plastic material.

Accordingly, the general object of the invention is to provide new and improved centripetal extruders.

Another object of the invention is to provide a multiple centripetal extruder having at least two extrusion channels.

Still another object of the invention is to provide a centripetal extrusion apparatus for extruding concentric layers of two different thermoplastic materials about an advancing wire.

A further object of the invention is to provide a multiple centripetal extrusion apparatus having spaced plates which may be adjusted to provide a predetermined channel width.

Yet another object of the invention is to provide a centripetal extruder having curved extrusion channels.

The above and other objects of the invention are accomplished, according to certain features of the invention, by providing at least three plates mounted in spaced relationship to each other along a central axis so that channels are defined between adjacent plates. Means are provided for feeding plastic material into the outer portions of the channels. Means are provided for causing relative rotation between adjacent plates about the central axis, so that the plastic material is advanced centripetally through the channels toward the central axis. Die means are also provided, communicating with inner portions of the channels, for forming the plastic material from the channels into a desired extruded shape.

Preferably, there are three coextensive circular plates provided which define channels having substantially parallel sides and means are provided for adjusting the spacing between the plates so as to regulate the widths of the channels. The die means may have ports communicating independently with the two channels and be designed for forming the plastic materials from the channels into concentric extruded layers about an advancing wire.

According to other features of the invention, the apparatus may include improvements in centripetal extruders including at least two relatively rotatable plates. An improvement in accordance with the invention consists of a structure wherein the facing surfaces of the two plates are congruently curved symmetrically in all directions leading away from the intersections between the plates and a central axis. Preferably, the plates have circular outer peripheries and the facing surfaces thereof, as viewed in any traverse cutting plane including the central axis, are curved along arcs of a circle having a radius between one and three times the outer diameter of the plates.

Other objects, advantages and features of the invention will appear from the following detailed description of a specific embodiment thereof, when read in conjunction with the appended drawings, in which.

Figure 1:
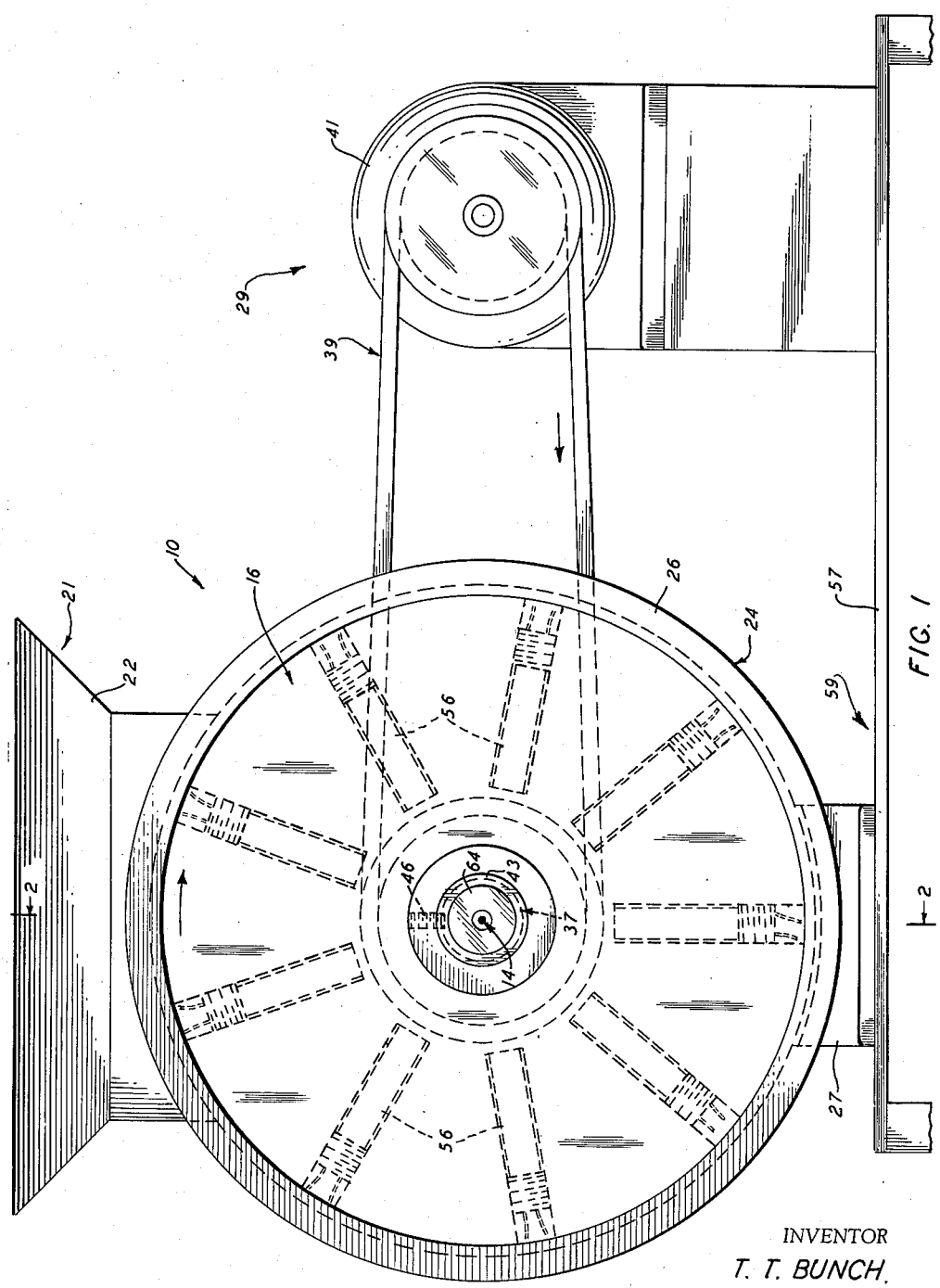
Fig. 1 is a front elevation of a preferred construction of multiple centripetal extruder according to the invention.
Figure 2:
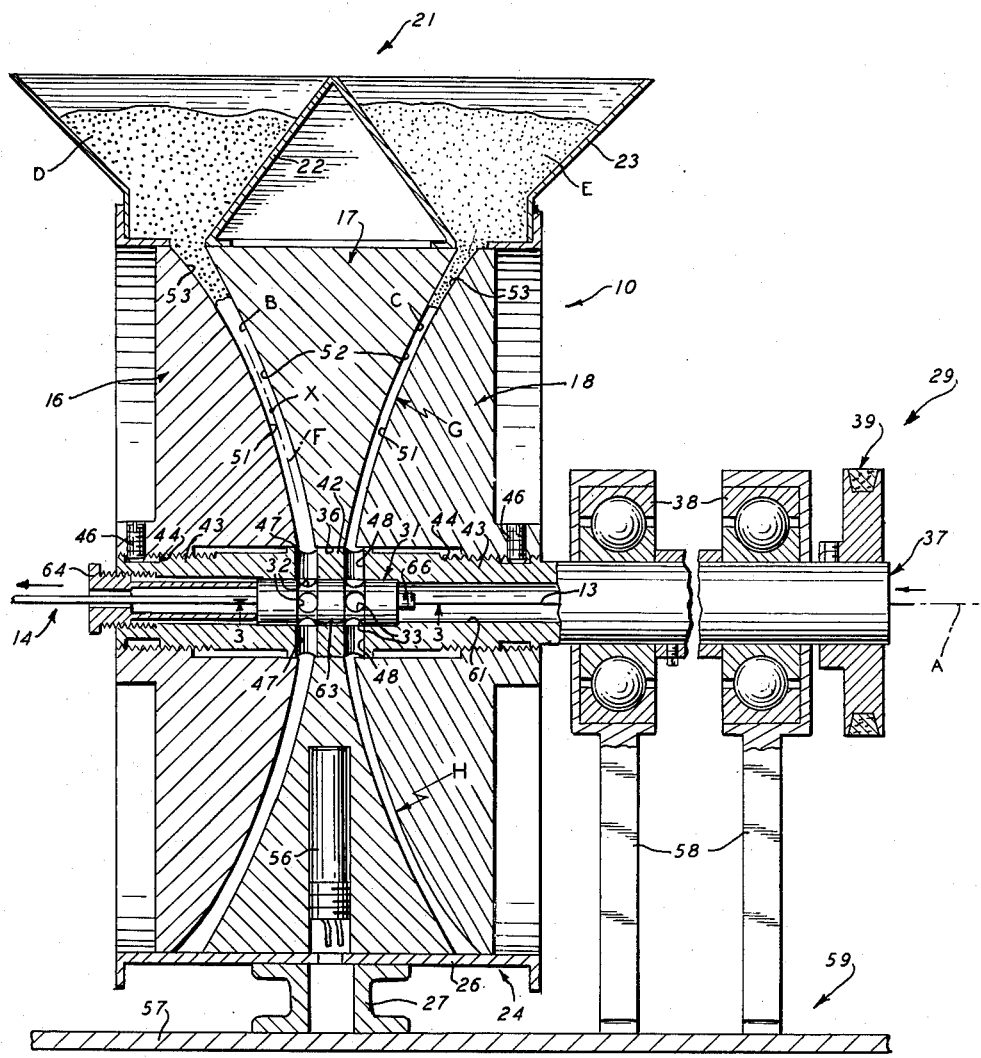
Fig. 2 is an enlarged vertical section, taken generally along the line 2—2 of Fig. 1 in the direction of the arrows.

Referring now in detail to the drawings and in particular to Figs. 1 and 2, a multiple centripetal extruder, designated generally by the numeral 10, is provided for extruding concentric sheaths 11 and 12 (Fig. 3) of plastic material about an advancing wire 13 to form a compositely sheathed wire, designated generally by the numeral 14.

The extruder 10 includes at least three working members or plates, three plates being shown and designated generally by the numerals 16, 17 and 18. The plates 16, 17 and 18 have circular outer peripheries and are mounted in spaced relationship to each other along a central axis A, which is coincident with the line of advancement of the wire 13 and is preferably horizontal. With this arrangement, a pair of extrusion channels B and C are defined between each pair of adjacent plates 16—17 and plates 17—18, respectively. The channels B and C have circular outer peripheries coaxial with the central axis A and, as illustrated in Fig. 2, lead centripetally or radially inward in all directions (360°) toward the central axis A.

Means, designated generally by the numeral 21, are provided for feeding plastic materials into the channels B and C from fixed positions adjacent to the outer peripheries thereof. In the embodiment shown, the feeding means comprises a pair of hoppers 22 and 23 mounted in fixed positions above the plates 16, 17 and 18 and communicating with the channels B and C, respectively. In one specific example, the hopper 22 may supply granules of polyvinyl chloride D to the channel B and the hopper 23 may supply granules of polyethylene E to the channel C. Such an arrangement might be used in the manufacture of certain types of telephone distribution wire, where it is desired to extrude an inner insulating sheath of polyethylene about a copper conductor and an outer jacket of polyvinyl chloride about the polyethylene sheath.

Closure means, designated generally by the numeral 24, are provided for retaining the plastic materials D and E within the channels B and C. Preferably, the closure means 24 consists of a retaining ring 26 mounted stationarily on a suitable stand 27 and fitting against the outer peripheries of the plates 16, 17 and 18 so as to surround the channels B and C and prevent the plastic materials D and E from escaping therefrom. The hoppers 22 and 23 are secured to the ring 26 near the upper end thereof.

Means, designated generally by the numeral 29, are provided for causing relative rotation between the plates in each of the pair of adjacent plates 16—17 and plates 17—18 about the central axis A so that the plastic materials D and E are advanced centripetally (that is, spirally inwardly) through the channels B and C toward the central axis A. As viewed in Fig. 2, it is preferred to maintain the channels B and C separate and noncommunicative with each other so that the plastic materials D and E therewithin are maintained separate and so that they are worked independently between the respective pairs of plates 16—17 and 17—18 defining the channels.

Figure 3:
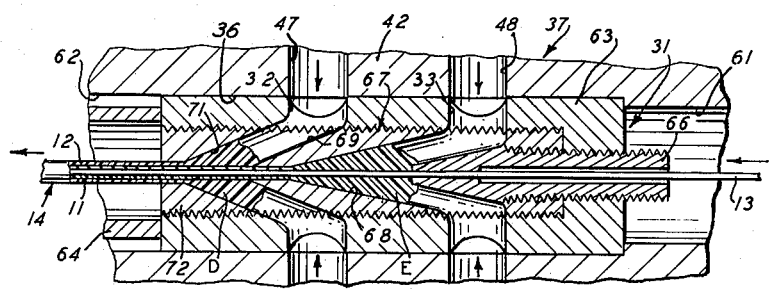
Fig. 3 is an enlarged, fragmentary horizontal section, taken generally along the line 3—3 of Fig. 2 in the direction of the arrows and illustrating details of a multiple die structure.

A die assembly, designated generally by the numeral 31, is provided and is mounted axially of the plates 16, 17 and 18 along the central axis A. The die assembly 31 communicates with inner portions of the channels B and C and is designed for receiving the plastic materials D and E from the channels B and C and for forming the plastic material into a desired extruded shape or shapes. Preferably, the die assembly 31 is multiplex and includes two sets of ports 32—32 and 33—33, which communicate independently and respectively with the channels B and C so as to receive the plastic materials D and E in separate streams for formation thereof into concentric extruded layers about the advancing wire 13. One advantageous design for the die assembly 31 is illustrated in Fig. 3 and will be described in detail hereinafter.

Although it should be understood that it is possible to provide more than three spaced plates, it is preferred to utilize only three plates having the specific surface configurations illustrated in Fig. 2, with the end plates 16 and 18 being rotatable and the central plate 17 being stationary. It is also highly desirable to provide means for individually and independently adjusting the spacing between each of the end plates 16 and 18 and the central plate 17, so as to permit setting of the width of the channels B and C in accordance with the type and amount of plastic material to be advanced therethrough.

As viewed in Figs. 1 and 2, the central plate 17 is secured in vertical position on the stand 27 and is provided with a circular central bore 36 therethrough. A hollow rotatable shaft, designated generally by the numeral 37, is mounted coaxially along the axis A and is designed for carrying the end plates 16 and 18 for rotation therewith. The shaft 37 is supported for rotation in bearings 38—38 and is driven through a belt-and-pulley transmission, designated generally by the numeral 39, from a suitable drive motor 41. The shaft 37 is provided with an intermediate portion 42 therealong, which fits closely within the bore 36 in the central plate 17 for rotation therewithin. The outer surface of the intermediate portion 42 of the shaft 37 and inner surface of the bore 36 in the plate 17 are co-operating bearing surfaces and fit closely together so that no plastic material may flow between the channels B and C.

The shaft 37 is also formed with a threaded portion 43 therealong on each side of the portion 42. The end plates 16 and 18 are formed with threaded bores 44—44 so that the plates 16 and 18 may be mounted threadedly on the shaft 37, one on each side of the central plate 17. The threaded mounting of the end plates 16 and 18 permits independent axial movement thereof toward and away from the stationary central plate 17 so as to permit adjustment of the widths of the extrusion channels B and C.

In operation, for a given difference in the relative angular velocities of the plates 16—17 and plates 17—18 in each pair of plates the widths of the channels B and C are set at predetermined values based (1) on the desired extrusion rate and (2) on the properties of the particular plastic materials to be extruded. For example, in the specific embodiment illustrated in Fig. 2, for a predetermined angular velocity of the plate 18 the channel C has a relatively small width to extrude the inner sheath 11 of polyethylene E at a predetermined volumetric rate, while for the same angular velocity of the plate 16 the channel B is significantly wider because of the differences in the two materials and to extrude the outer jacket 12 of polyvinyl chloride D at a faster volumetric rate, the volume of polyvinyl chloride per linear inch of finished product 14 being larger than the corresponding volume of polyethylene. The positions of the end plates 16 and 18 are adjusted by merely turning them on the shaft 37 until a desired spacing from the central plate has been achieved. If desired, suitable micrometric indicators (not shown) may be provided to indicate the spacing precisely. A plurality of set screws 46—46 are provided for locking the end plates 16 and 18 on the shaft 37 for rotation therewith in their adjusted positions.

The shaft 37 is provided with two sets of ports 47—47 and 48—48 communicating respectively between the channels B and C and the ports 32—32 and 33—33 in the die assembly 31 to convey the plastic materials D and E from the channels B and C into the interior of the die assembly 31. In the embodiment illustrated, there are four ports 47—47 and four ports 48—48 formed at 90° intervals around the shaft 37.

According to the theory of centripetal extrusion, the material to be extruded must be in a highly viscous or gummy state so that it will tend to cohere to itself and to adhere to the surfaces of the plates and a high rate of shear will be caused within the material itself when the plates have relative rotation with respect to each other. The plastic materials D and E are worked in the channels B and C between inner surfaces 51—51 of the end plates 16 and 18 and outer surfaces 52—52 of the central plate 17 by the relative rotation between the plates. Since a closed mechanical system is defined, either plate of a pair may be rotated or both plates may be rotated in opposite directions.

Assuming that the plate 16 is being rotated in a clockwise direction, as viewed in Fig. 1, then particles of the material D in the portion of the channel B to the left and right of a particle X in Fig. 2 located on an axis F of the channel B will tend to move along substantially spiral paths in a clockwise direction as viewed by an observer viewing the extruder 10 as in Fig. 1. Since the particle X lies along an axis F where the greatest centripetal motion is developed, the components on opposite sides thereof directed toward and away from the observer balance each other and there is no net motion of the particle X in a horizontal plane toward or away from the observer except as the particle X moves toward the axis of rotation A in an imaginary curved surface containing the axis F. However, the two components on opposite sides of the particle X directed down add to each other and tend to drive the particle X down (that is, centripetally) toward the axis A of rotation.

The particles to the left and right of the particle X will be similarly affected; however, there will also be a horizontal component toward or away from the observer, so that the resultant of the forces tends to move these particles spirally inward toward the central axis A. Thus, a gradient of centripetal motion is established across the width of the channel, with the maximum at the axis F and the minimum, zero, or even a centrifugal motion being encountered along the surfaces 51 and 52, particularly along the surface 51 of the rotating plate 16. In this connection, the plates should be spaced close enough together to avoid any substantial centrifugal or radially outward motion. Because of the gradient of centripetal movement, the plastic material also flows from positions near the walls 51 and 52 toward the axis F.

The centripetal motion accomplished by the shear forces overcomes the effect of centrifugal force, which would otherwise drive the revolving particles outward. When only one plate is rotated, the local centrifugal forces at the surface of the rotating plate is four times as great as that when both plates are rotated in opposite directions since the plate must rotate twice as fast in order to extrude the plastic at the same volumetric rate. This factor should be kept in mind for some applications, particularly high speed applications, wherein the effect of centrifugal force might become deleterious. For most applications, however, the apparatus operates well with rotation of only one of the plates.

Preferably, the facing surfaces of each pair of adjacent plates 16—17 and 17—18 are congruently curved symmetrically in all directions leading away from the intersections between the plates and the central axis A. This construction allows an increased build-up of pressure for a given channel width and speed of rotation, thus facilitating the extrusion operation. Such a construction is highly preferable in a duplex centripetal extruder, but may also be utilized in a simplex centripetal extruder having only two plates.

As viewed in Fig. 2, the end plates 16 and 18 are mirror images of each other, with the inner surfaces 51—51 thereof being convexly curved in all directions (360°) symmetrically about the points of intersection between the surfaces 51—51 and the central axis A. The outer surfaces 52—52 of the central plate 17 are congruently concavely curved with respect to the surfaces 51—51 over at least the major portions of the lengths thereof. Thus, the opposing surfaces 51—51 and 52—52 are substantially superposed one upon the other when the end plates 16 and 18 have been moved on the shaft 37 to their extreme central positions. Conversely, a pair of symmetrical channels B and C having curved parallel sides are defined by the opposing surfaces 51—51 and 52—52 when the end plates 16 and 18 have been moved to their spaced, operating positions.

Although it would be entirely feasible to provide the channels B and C with curved parallel walls 51 and 52 throughout, it is preferable to provide a slight divergence from parallism over a short distance near the outer peripheries of the plates to facilitate feeding of the plastic materials D and E from the hoppers 22 and 23 into the channels B and C. Such divergence is illustrated in Fig. 2, with enlarged entrance apertures indicated by the numerals 53—53 being formed thereby. The entrance apertures 53—53 should extend over only about two to fifteen percent of the distance between the central axis A and the peripheries of the plates.

Preferably, the facing surfaces 51—51 and 52—52 are curved, as viewed in any transverse cutting plane including the central axis A, along arcs of a circle having a radius between one and three times the outer diameter of the plates 16, 17 and 18. For example, as viewed in the vertical cutting plane illustrated in Fig. 2, the diameter of all three of the plates 16, 17 and 18 is eighteen inches and the radius of curvature is twenty-four inches, thus the radius of curvature is 1⅓ times the diameter of the plates.

According to the most advantageous construction, the center of curvature of each arc containing a line on the surface of the particular plate 16, 17 or 18 drawn between the outer periphery of the plate 16, 17 or 18 and the central axis A lies in the transverse cutting plane offset from the axis A on the opposite side from the arc, being described, by a distance between five and twenty percent of the radius of the arc. For example, as viewed in Fig. 2, the center of curvature (not shown, but understood to be off the page to the right of Fig. 2) for the upper arc G of the plate 18 is displaced by a distance of three inches below the central axis A, and the corresponding center (not shown) for the lower arc H of the same plate is three inches above the axis A. This amounts to a displacement of 12½%.

The plastic materials D and E are preferably introduced into the hoppers 22 and 23 in granular form, but might also be in fluid form. A series of heating elements 56—56 are embedded in the stationary central plate 17 to facilitate fluidation of the materials. For many applications it may be possible to dispense with any exogenous heating and rely exclusively on the shearing forces developed between the relatively rotating plates 16, 17 and 18 to work the plastic materials to the desired fluid state. For some applications, it may even be desirable to provide cooling means and, in this case, the heating elements 56—56 would be dispensed with and cooling elements substituted therefor; or, a thermostatically controlled heat exchanger may be provided to maintain any desired temperature.

The supporting stand 27 for the stationary plate 17, the ring 26, and the hoppers 22 and 23 are mounted on top a suitable base, such as a table 57, as are a pair of standards 58—58 for supporting the bearings 38—38. The table 57, the stand 27 and the standards 58—58, considered as a unit, define a unitary support designated generally by the numeral 59.

Referring now in detail to the particular multiple die assembly 31 illustrated in Fig. 3, the shaft 37 is formed with an axial bore 61 and a counterbore 62 at the left of the bore 61. A mounting shell 63 for extrusion die elements to be described is secured within the counterbore 62 by means of an elongated, threaded collar 64. The two sets of ports 32—32 and 33—33, described hereinbefore, are drilled through the shell 63 and communicate between the interior of the shell 63 and the associated ports 47—47 and 48—48 of the shaft 37.

In the illustrative example, a stream of polyethylene E advances through the right-hand channel C, as viewed in Figs. 2 and 3; through the ports 48—48 and 33—33; and then proceeds into a rear or right-hand section of the shell 63. Conversely, a stream of polyvinyl chloride D advances through the channel B and the ports 47—47 and 32—32 into a forward or left-hand section of the shell 63. The designations forward and rear pertain to the direction of travel of the wire 13 through the shell 63.

A first core tube 66 is threaded into the shell 63 at the right end thereof, as viewed in Fig. 3, the tube 66 being axially bored so that the wire 13 may advance continuously therethrough. A compound die and core-tube member, designated generally by the numeral 67, is threaded into the shell 64 to the left of the first core tube 66 and in spaced relationship thereto. A tapering axial aperture 68 in the compound member 67 serves as a first die element, which cooperates in well-known fashion with the outer surface of the first core tube 66 to form the stream of polyethylene E into the inner sheath 11 about the wire 13. The compound member 67 is likewise provided with a tapered outer surface 69, which functions as a second core tube for co-operation with a tapered die opening 71 in a second die 72 to form the stream of polyvinyl chloride D into the outer sheath 12 concentrically around the inner sheath 11 of polyethylene. The second die 72 is threaded into the left end of the shell 63 in predetermined spaced relationship to the compound member 67.

While the die assembly 31 illustrated in Fig. 3 is a simple and efficient structure for forming individual concentric layers of two different plastic materials about an advancing wire, there are numerous other forms of multiple die means which might be employed to accomplish the same result. Although extrusion about a wire has been described, it should be understood that it would be possible to extrude two concentric sheaths about a removable central mandrel in the manufacture of tubing and that a solid extruded core might be formed with no central member being needed.

It would also be possible to provide multiple die means for forming two or more streams of plastic material into individual extruded shapes, such as parallel insulated wires preferably of different colors. In this case, noncommunicating forming chambers would be provided within the die assembly. In addition, it would be possible to provide an extrusion capsule where all separate streams of plastic material converge into a single stream, as for extrusion about a single advancing wire, the provision of two extrusion channels providing equalization of thrust and suppling a greater amount of plastic material than might otherwise be possible.

It will likewise be obvious that various other modifications may be made from the specific details described hereinabove without departing from the spirit and scope of the invention.

What is claimed is:

1. A multiple centripetal extruder, which comprises at least three plates mounted in spaced relationship to each other along a central axis so that a plurality of channels are defined between adjacent plates, means for feeding plastic material into the outer portions of the channels, means for causing relative rotation between adjacent plates about the central axis so that the plastic material is advanced centripetally through the channels toward the central axis, and die means communicating with inner portions of the channels for forming the plastic material from the channels into a desired extruded shape.

2. Apparatus for extruding composite layers of plastic material, which comprises at least three plates mounted in a row along a central axis in spaced relationship to each other so that a plurality of channels are defined between adjacent plates in the line, at least one of two adjacent plates which cooperate to form individual channels having a circular outer periphery and being mounted coaxially of the central axis for rotation thereabout so that the channels have effectively circular outer peripheries and extend inward between the adjacent plates toward the central axis, means for feeding plastic material between each pair of adjacent plates into the channels from the outer peripheries thereof, closure means surrounding the channels for retaining the plastic material therewithin, means for causing relative rotation between adjacent plates forming the channels about the central axis so that the plastic material within the channels is worked between the adjacent plates and is forced inwardly toward the central axis, and die means mounted along the central axis and communicating with each channel for receiving separate streams of plastic material from the several channels, said die means being designed for forming the plastic material into composite extruded layers.

3. A multiple centripetal extruder, which comprises at least three plates mounted in spaced relationship to each other along a central axis so that channels are defined between adjacent plates, said plates being so shaped and disposed that the channels have substantially parallel sides and that outer portions thereof have circular peripheries coaxial with the central axis, means for adjusting the spacing between said plates to regulate the widths of the channels, means for feeding plastic material into the outer portions of the channels, closure means surrounding the channels for retaining the plastic material therewithin, means for causing relative rotation between adjacent plates about the central axis so that the plastic material is advanced centripetally through the channels toward the central axis, and die means communicating with inner portions of the channels for forming the plastic material from the channels into a desired extruded shape.

4. A dual centripetal extruder, which comprises three circular plates mounted coaxially in spaced relationship to each other along a central axis so that a pair of separate noncommunicating channels having outer portions of circular periphery are defined between said plates, the inner surfaces of the two end plates facing the central plate being convexly curved in all directions symmetrically about the central axis and the facing outer surfaces of the central plate being congruently concavely curved, means for adjusting the spacing between said plates to regulate the widths of the channels, means for feeding plastic materials separately into the outer portions of the two channels, closure means fitting against said plates and partially surrounding the channels for retaining the plastic materials in the channels, means for causing relative rotation between adjacent plates about the central axis so that the plastic materials are advanced separately centripetally through the two channels toward the central axis, and die means communicating independently with inner portions of the two channels for forming the plastic materials from the channels into a desired extruded shape.

5. A multiple centripetal extruder, which comprises a support, three circular plates carried by said support in spaced relationship to each other coaxially along a central horizontal axis so that a pair of separate noncommunicating channels having outer portions of circular periphery are defined between said plates, a hopper means supported above said plates and in alignment with the channels for feeding plastic materials separately into the two channels, a retaining ring secured to said support and fitting against said plates to surround the channels for preventing the plastic materials from escaping therefrom, means for rotating at least one of said plates so that relative rotation is effected between pairs of adjacent plates about the central axis with the plastic materials being advanced centripetally through the channels toward the central axis, and multiple die means mounted along the central axis and having ports communicating separately with each channel for receiving separate streams of plastic material therefrom, said die means being designed for forming the plastic materials into composite extruded layers.

6. Apparatus for extruding composite layers of plastic material, which comprises a support; a stationary intermediate plate secured to said support, said intermediate plate having a circular periphery and a circular central bore therethrough; a rotatable shaft mounted on said support and fitting closely within the bore in said central plate for rotation therewithin, said shaft having threaded portions extending outward from said central plate on both sides thereof; a pair of end plates having circular peripheries and threaded central bores, said end plates being received threadedly on said shaft one on each side of said central plate, the inner surfaces of said end plates facing said central plate being substantially parallel to the facing outer surfaces of said central plate so that a pair of parallel-walled channels having outer portions of circular periphery are defined between said central plate and said end plates, the threaded mounting of said end plates on said shaft permitting movement thereof toward and away from said central plate to adjust the widths of the channels; means for locking said end plates in adjusted positions on said shaft for rotation therewith; means for feeding plastic materials separately into the two channels from the outer portions thereof; a retaining ring secured to said support and surrounding the outer peripheries of said plates closely for retaining the plastic materials in the channels; means for rotating said shaft to rotate said end plates so that the plastic materials are advanced centripetally through the channels toward the axis of said shaft; and dual die means mounted within said shaft and having ports communicating separately with each channel for receiving separate streams of plastic material from the channels, said die means being designed for forming the plastic material exiting from the channels spirally into composite extruded layers.

7. Apparatus for extruding composite layers of two different thermoplastic materials about an advancing wire, which comprises a support; a stationary central plate secured vertically to said support, said central plate having a circular periphery and a circular central bore therethrough; a hollow rotatable shaft mounted coaxially about a central axis horizontally on said support and fitting closely within the bore in said central plate for rotation therewithin, said shaft having threaded portions extending outward from said central plate on each side thereof; a pair of end plates having circular peripheries and threaded central bores, said end plates being received threadedly on said shaft one on each side of said central plate, the inner surfaces of said end plates facing said central plate being convexly curved in all directions symmetrically about the axis of said shaft and the facing outer surfaces of said central plate being congruently concavely curved so that a pair of symmetrically curved channels are defined between said central plate and said end plates curving divergently away in all directions from the intersections between the outer surfaces of said central plate and the central axis, the threaded mounting of said end plates on said shaft permitting movement of said end plates toward and away from said central plate to adjust the widths of the channels to predetermined values based on the properties of the plastic materials and the desired rates of extrusion thereof; means for locking said end plates in their adjusted positions on said shaft for rotation therewith; a pair of hoppers secured to said support in positions above said plates and in alignment with the channels for continuously feeding the two thermoplastic materials, one into each channel; a retaining ring secured to said support and fitting against said plates so as to surround the channels and prevent the plastic materials from escaping therefrom; means for rotaing said shaft to rotate said end plates so that the plastic materials within the channels are separately worked between said stationary central plate and said rotating end plates and are forced centripetally inward within the channels toward the central axis, the close fit between said central plate and said shaft preventing transfer of the plastic materials from one channel to the other; and dual die means mounted within said hollow shaft, the wire advancing coaxially through said hollow shaft and said die means, said die means having ports communicating separately with each channel for receiving separate streams of plastic material from the channels, said die means being designed for forming the plastic materials from the channels into composite extruded layers about the wire.

8. In a centripetal extruder including at least two relatively rotatable plates mounted in spaced relationship along a central axis so as to define therebetween an extrusion channel having a circular periphery and through which channel plastic material is advanced centripetally toward the central axis; the improvement wherein the facing surfaces of the two plates are congruently curved symmetrically in all directions leading away from the intersections between the plates and the central axis.

9. The apparatus defined in claim 8, wherein the plates have circular outer peripheries and the facing surfaces thereof, as viewed in any transverse cutting plane including the central axis, are curved along arcs of a circle having a radius between one and three times the outer diameter of the plates.

10. The apparatus defined in claim 9, wherein the centers of curvature of the arcs extending between the outer peripheries of the plates and the central axis and containing lines on surfaces of the plates, lie in the transverse cutting plane at a distance between five and twenty percent of the radius of the circle on the opposite side of the central axis from the arc being described.

11. The apparatus defined in claim 10, wherein the facing surfaces are congruent over 85 to 98% of the distance between the central axis and the outer peripheries of the plates, and diverge thereafter to define enlarged entrance passages for the plastic material.

References Cited in the file of this patent

FOREIGN PATENTS 1,177,383    France ------------------ Dec. 1, 1958

OTHER REFERENCES

Weissenberg, Dr. K.: Nature, v. 159, pp. 310 and 311, March 1, 1947.